United States Patent [19]

Becker

[11] 4,172,331
[45] Oct. 30, 1979

[54] DISPLAY APPARATUS FOR THE PERSONALIZATION OF A VEHICLE

[76] Inventor: Sanford G. Becker, 3025 NE. 25th St., Fort Lauderdale, Fla. 33305

[21] Appl. No.: 814,906

[22] Filed: Jul. 12, 1977

[51] Int. Cl.² ............................................. G09F 21/04
[52] U.S. Cl. .......................................... 40/591; 40/618
[58] Field of Search ................................. 40/591-595, 40/206, 209, 618, 620; 156/293, 298; 33/178 R, 180 R, 184.5

[56] References Cited

U.S. PATENT DOCUMENTS

| | | | |
|---|---|---|---|
| 1,870,221 | 8/1932 | Babcock | 40/618 |
| 1,876,405 | 9/1932 | Enscott | 40/591 |
| 2,543,605 | 2/1951 | Smith | 40/591 |
| 3,461,583 | 8/1969 | Buck | 40/595 |
| 3,506,528 | 4/1970 | Dean | 40/594 |
| 3,526,986 | 9/1970 | Dempnock et al. | 40/595 |

FOREIGN PATENT DOCUMENTS

| | | | |
|---|---|---|---|
| 387286 | 2/1933 | United Kingdom | 40/209 |
| 781339 | 8/1951 | United Kingdom | 40/209 |

*Primary Examiner*—John F. Pitrelli
*Assistant Examiner*—G. Lee Skillington
*Attorney, Agent, or Firm*—Pennie & Edmonds

[57] ABSTRACT

A vehicle is personalized or individualized by a display that may contain e.g. the owner's name, in a manner fully integral with the style and appearance of the vehicle itself. The display is preferably in the form of characters or other indicia affixed to a base member supported in a frame carried on the body surface of the vehicle to set off the area within it. The base member is formed to provide continuity in the contour and appearance of the body surrounding the frame, be it the grill network, the continuous metal body surface or some other body portion, and preferably forms an adequately planar surface so as to facilitate attachment of the characters thereto. The display may be aligned for mounting with respect to the base member by a template, which may be of the type either for transferring the display directly to the base member or for initially locating guide indicia in accordance with the final display in order to define and locate attachment points on the base member, and then fastening the actual characters or indicia at the attachment points so defined.

11 Claims, 15 Drawing Figures

DISPLAY APPARATUS FOR THE PERSONALIZATION OF A VEHICLE

BACKGROUND OF THE INVENTION

The present invention relates to the personalization or individualization of a vehicle such as an automobile through the use of a display, for example the owner's name, in a manner fully integral with the overall design and appearance of the vehicle.

Personalization or individualization of automobiles, such as by customizing, has probably been popular for as long as there have been automobiles, and it would seem that personalization of vehicles generally is much older. Personalization has taken a wide variety of forms, from the unique design of an entire vehicle body, to custom interior design, specialized exterior trim and unique individualized paint jobs.

One form of personalization generally has been the application to the vehicle of some form of the owner's name, sometimes in the form of a license plate-type display, and in some instances by painting the name or initials directly on the vehicle. With the possible exception of very small carefully executed sets of personalized initials, usually mounted or painted on the vehicle door, the application of a name to an automobile has generally been less than completely compatible with the vehicle's overall design and appearance. That is, application of the name appears to be an addition, or afterthought, rather than an integral feature of the vehicle itself, and may detract from the integrity and unity of the vehicle's appearance.

The popularity of this form of automotive personalization is evidenced by the availability of and demand for personalized license plates, bearing for example part of the owner's name or a variation of it instead of a mere arbitrary combination of characters, despite the extra cost of such personalization. This type of display is nevertheless severely limited in the number of characters that can be displayed, and is by no means capable of constituting an integral part of the vehicle's design.

BRIEF DESCRIPTION OF THE INVENTION

In accordance with the invention, apparatus is provided for displaying characters or indicia on the body of a vehicle in a manner fully consonant with the overall design, style and appearance of the vehicle itself. The display thus appears as an integral part of the vehicle, yet according to the invention it need not be manufactured as part of the vehicle but may be installed after manufacture, for example at the point of sale, and may be changed if desired without comprising the vehicle's integrity or appearance.

The apparatus broadly comprises a frame carried by the body of the automobile, on the sides or at any location on the automobile, but preferably within the general area of the front or rear of the automobile, and a base member within the frame which carries the characters or indicia forming the display. The frame may for example be carried within the region of the grill network or the front hood, below the hood and centered with respect to the hood emblem, or on or below the trunk lid, preferably centered with respect to the trunk emblem. The base member upon which the display is mounted is releasably secured to the frame, or to the vehicle body adjacent the frame, so that it is capable of replacement with a substitute base member for any reason requiring that the display be changed. The base member thus appears, in presentation and disposition, continuous with that portion of the body of the vehicle immediately surrounding the frame.

The display may in accordance with the invention comprise alphabetic or numeric characters, or any other indicia susceptable of representation in discrete form compatible with the structural display elements described herein. In a preferred embodiment, the display comprises letters of the alphabet arranged to form the surname of the vehicle owner. Preferably, such letters are provided in a font identical to that in which the name of the vehicle is displayed, thereby enhancing the uniformity and continuity of the display as an integral part of the vehicle. In accordance with one embodiment of the invention, the display may comprise the owner's surname, followed or preceded by the manufacturer's name or model name of the automobile, so that it becomes unnecessary for any other name to appear on the vehicle.

In order to facilitate attachment of the display to the base member, templates may be provided for centering both even and odd-numbered letter displays.

Each template includes a plurality of alignment means each adapted for receiving and positioning either a letter or a letter positioning replica. Means are provided for accurately locating the template with respect to the frame, and thereby relative to the base member, for facilitating direct mounting of the letters on the base member or for accurately positioning the letter replicas that define and locate the letter attachment points.

The base member, while preferably formed to give the outward appearance that it is an integral portion of the vehicle body, is actually an element separate from the body, such that it may be replaced in order to provide a new display. Such a change may be required or desired, for example, by a change in the vehicle owner's name (e.g. by marriage), by a change in ownership or upon repair or repainting of the vehicle. Base members may alternatively be provided with textured or other special surfaces compatible with the style and appearance of the vehicle and of the characters of the display, but not necessarily identical with the body surface adjacent the frame. For example, a particular luxury automobile may be provided with a base member forming a leather surface backed by yieldable polyurethane foam, for added depth and plushness.

To accommodate such changes and variations, the base member is preferably formed as a separate element, capable of being secured at its margins to the frame or to the vehicle body adjacent the frame in order to convey the appearance of body continuity. Alternatively, when the vehicle is manufactured, rather than cutting out part of the body only to replace it with a separate base member, the body may be scored along a periphery defining the base member such that it can be removed, if desired, and substituted by a replacement base member.

DESCRIPTION OF THE DRAWINGS

The foregoing and other features of the invention will be further described by reference to the accompanying drawings, in which.

DESCRIPTION OF PREFERRED EMBODIMENTS

Any form of personalization of a vehicle capable of representation in the form of a series of discrete elements may be employed within the scope of the present invention, and any vehicle may be so personalized. However, the remaining portion of this description will be directed to a display in the form of a sequence of letters representing the name of the owner of an automobile, for example, "BECKER".

Figure 1A:
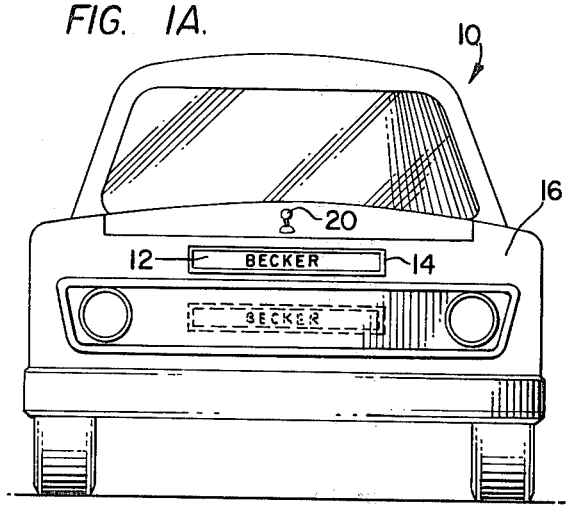
FIG. 1A is a front view of an automobile illustrating a display which may be in the form of the name of the owner of the vehicle.
Figure 1B:
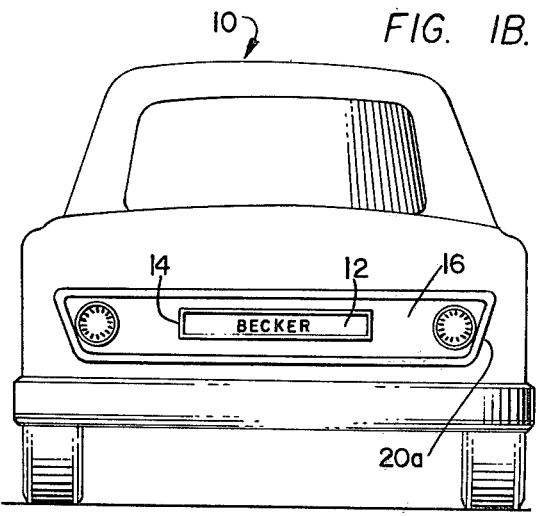
FIG. 1B is a rear view of the automobile illustrating another location for the display illustrated in FIG. 1A.

Referring to the drawings, FIGS. 1A and 1B depict the personalization of an automobile 10 by means of a display in the form of a name, such as the name of the owner of the automobile. Front and rear views of the automobile, the particulars of which are outside the scope of the present invention except insofar as the automobile provides a support for the display, are illustrated generally in FIGS. 1A and 1B for purposes of suggesting locations for the display. Thus, in the practice of the present invention the display may be located on the body of the automobile within the area of the grill network, immediately above the grill network beneath the junction of the engine compartment hood and the body (FIG. 1A), or on the rear body below the trunk lid (FIG. 1B). These are intended as suggestive examples; any other aesthetically pleasing location may be selected. The display is mounted on a base member 12 which defines the vehicle surface within frame 14. The base member is formed to appear as a continuous portion of the body 16 which may be the molded surface of the automobile or the grill network, depending upon the location of the display, yet is a separate component capable of being releasably amounted on the rear of the frame 14. The securing means for this purpose may comprise a plurality of machine screws 15 (FIG. 3A) which pass through spaced openings in the hidden margin of the base member 12 and into frame 14. This operation is simplified when the display and thus the frame is positioned in the vicinity of the engine compartment or the trunk, such that its obverse face is readily accessible.

The frame itself may be embossed or otherwise embellished to be consistent in overall design with the body style and chrome stripping or other decorative trim employed, such as emblem 20 or chrome strip 20a. In this manner, the design appearance of the vehicle will be continued into the frame and the frame will constitute an element of customizing irrespective of whether or not the automobile is personalized by a name display. The frame may be formed as an integral part of the vehicle body itself, or may be part of a grill or other decorative structure, such as chrome stripping. The frame may alternatively be welded to the vehicle body, secured thereto by machine screws (preferably near its outer margin, so as to leave an inner margin or border free for attachment thereat of the base member) or may be attached in any other manner compatible with its intended purpose. The frame may have a chrome or other metallic surface, or may be painted as an integral part of the surrounding body area. Alternatively, it may be finished in a color or surface contrasting with that of the adjacent body region. mounted The base member is preferably formed of the same material as the surrounding body surface, although it may be or be faced with a different material, for example a leather surface on a plastic or metal base.

Figure 2A:
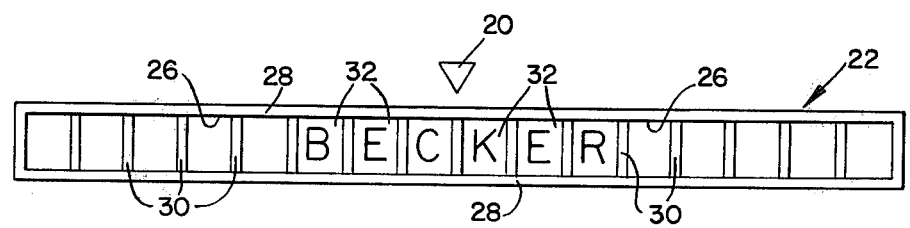
FIGS. 2A and 2B illustrate generally templates having even and odd numbers of receiving means, respectively, in frames positioned below and centered with respect to the hood emblem of an automobile.
Figure 2B:
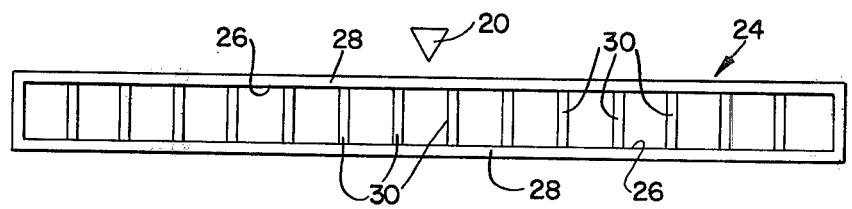

The letters of the display may be aligned and secured to the base member in several ways. It is important, nevertheless, that they be secured cleanly and neatly in a manner that is consistent with and does not detract from the vehicle's overall appearance. Templates 22 (FIG. 2A) and 24 (FIG. 2B) may be used for the application of letters to the base member in the case of names having respectively an even and an odd number of characters. In this manner, the name will be precisely centered on base member 12. Each template includes a plurality of alignment means 26 in the form of openings defined by a template body 28, the exterior of which is dimensioned to be substantially contiguous with the inner surface of the frame. The alignment means are spaced apart by spacers 30 extending perpendicularly to the horizontal portions of template body 28. The alignment means 26, in the form of openings of equal size, accommodate guides 32, each of which may support either a letter or a letter replica in the sequence of characters forming the name, in this case "BECKER". Note that since the name "BECKER" has an even number of letters the template of FIG. 2A is employed such that half of the letters appear on each side of and centered with respect to the vehicle emblem 20.

Figure 3A:
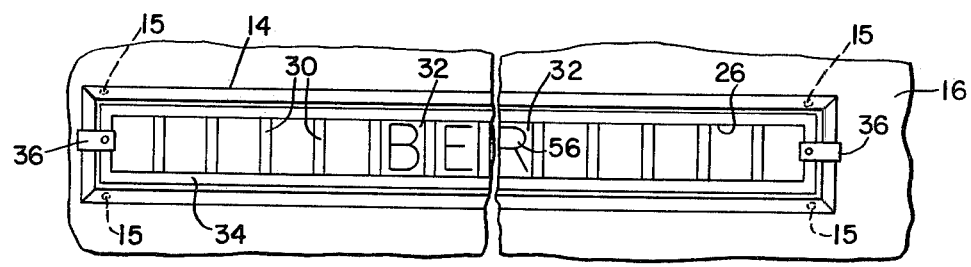
FIG. 3A shows a template secured to the frame, the template being partially broken away.
Figure 3B:
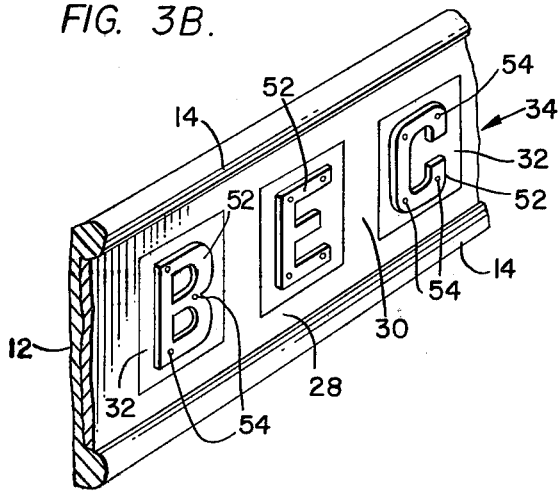
FIG. 3B is an enlarged partial view illustrating how the template of FIG. 3A is used in locating elements of a display to the base member.
Figure 3C:
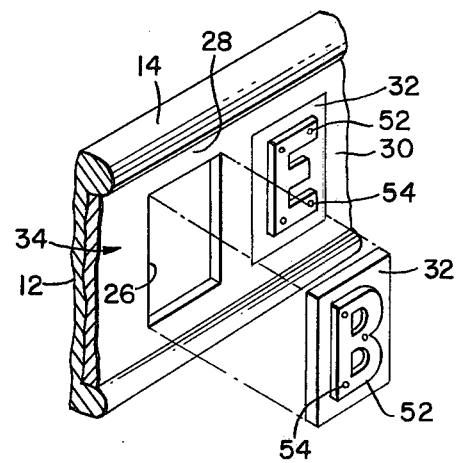
FIG. 3C illustrates a portion of the template of FIG. 3A with one of the guide characters in place and another one of the guide characters exploded out of its receiving means.
Figure 4:
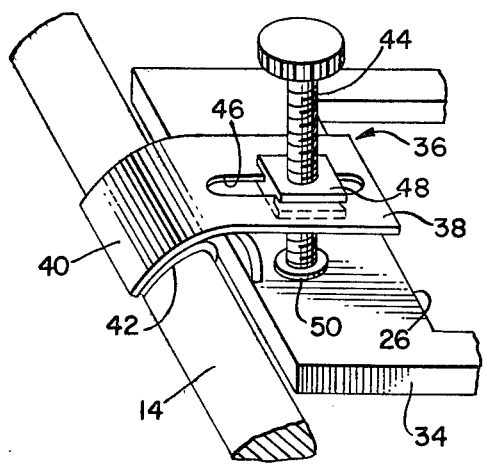
FIG. 4 is a perspective view of a portion of the template of FIG. 3A together with holding means for positionally supporting the template on the frame.

Referring to FIGS. 3A, 3B and 3C, a template apparatus in accordance with one embodiment of the invention includes a template member 34, dimensioned as described above so that it may be received within and aligned with respect to frame 14 and the base member 12 within it. Use of the template in aligning and fastening the characters to the base member is facilitated by fastening means 36, shown in greater detail in FIG. 4. The fastening means includes a clamp 38, one end of which forms an arcuate portion 40 within which is provided a rubber cushion member 42 for application to the frame 14 without marring its surface. A tightning bolt 44 engages a nut 48 slotted with its sides to slideably engage an elongated slot 46. This arrangement permits use of the template apparatus with frames of somewhat varying size, always permitting the clamp both to fasten to the frame and to secure the template by footpiece 50 against the base member.

To further illustrate the manner of use of such template, FIG. 3B shows a segment of a template 28 after it has been positioned with respect to the frame and base member using a fastening means 36 wherein guides 32, supporting letters selected from a set thereof according to the particular name to be displayed, are inserted in alignment means 26 (FIG. 3C).

As illustrated by FIG. 3C, the template body 34 and the guides 32 are dimensioned such that each letter fits snugly into its guide, which similarly fits into alignment means 26 so as to essentially prevent movement that might otherwise lead to misalignment of the characters. To this end, template 34 should be thick enough to securely support the guides.

Figure 3D:
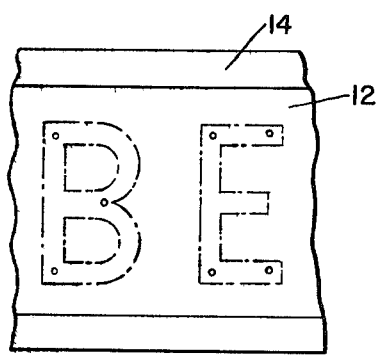
FIG. 3D is a partial view of the base member illustrating the location of elements of the display, shown in phantom.

Each guide 32 supports a replica 52 of a letter of the alphabet. Each replica, which may be an integral part of or fastened to a guide means in any conventional fashion, is three-dimensional so as to provide a body raised from the surface of the guide to form a convenient surface facilitating finger engagement for the replacement and withdrawal of the guides from their respective alignment openings. Each replica 52 and guide 32 includes two or more holes 54, which are adequate to permit insertion of a punch or scoring instrument so as to score the underlying base member in the locations precisely thereby defined. Note that since the area of each final letter available for fastening it to the base member varies greatly, it is not feasible to use a single guide for providing mounting holes for all characters of the alphabet which will at the same time enable those characters to be securely mounted and aligned. Thus the position of the scorings or markings will be determined by the particular letter selected in each location as illustrated in FIG. 3D wherein the markings on base 12 have been formed by employing replicas of the letters "B" and "E", shown in phantom outline.

Figure 3E:
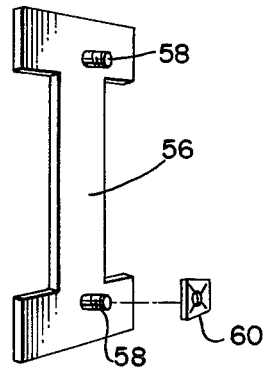
FIGS. 3E and 3F are perspective rear views of an element of the display illustrating two types of means for attaching the element to the member.
Figure 3F:
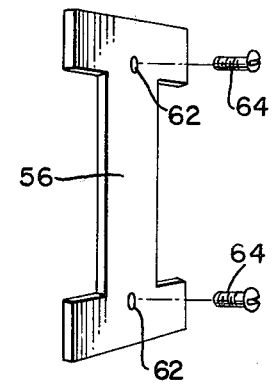

After the markings have been made, the replicas are removed and holes drilled at each location marked, so that a permanent letter corresponding to each replica letter can subsequently be fastened to the base member. The particular number and location of the markings formed with each replica will thus be dependent upon the letter involved so as to assure positional stability. FIGS. 3E and 3F illustrate respectively two means of attaching the letters to the base member, after the markings made therein and holes drilled in the base member corresponding to the markings. FIG. 3E illustrates the letter "I" with two threaded projections 58 extending therefrom corresponding to the two holes drilled in positions corresponding to the markings located by the replica letter "I". A lock nut or equivalent device, such as a Tinnerman fastener, is then placed on each of the projections 58 after they have been inserted in the holes of the base member to hold the letter in place.

FIG. 3F illustrates an alternative mode of attachment in which each letter includes two or more tapped bores 62 at its rear surface in alignment with the holes 54 in the corresponding replica 52; machine screws 64 are then used to securely fasten the letter to the base member.

Figure 5A:
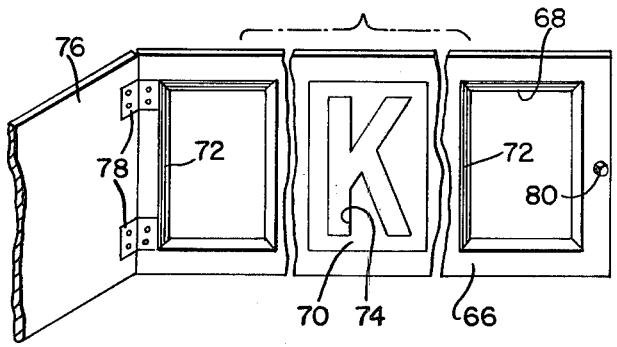
FIG. 5A is a front view of a second form of template for locating elements of the display on the base member.
Figure 5B:
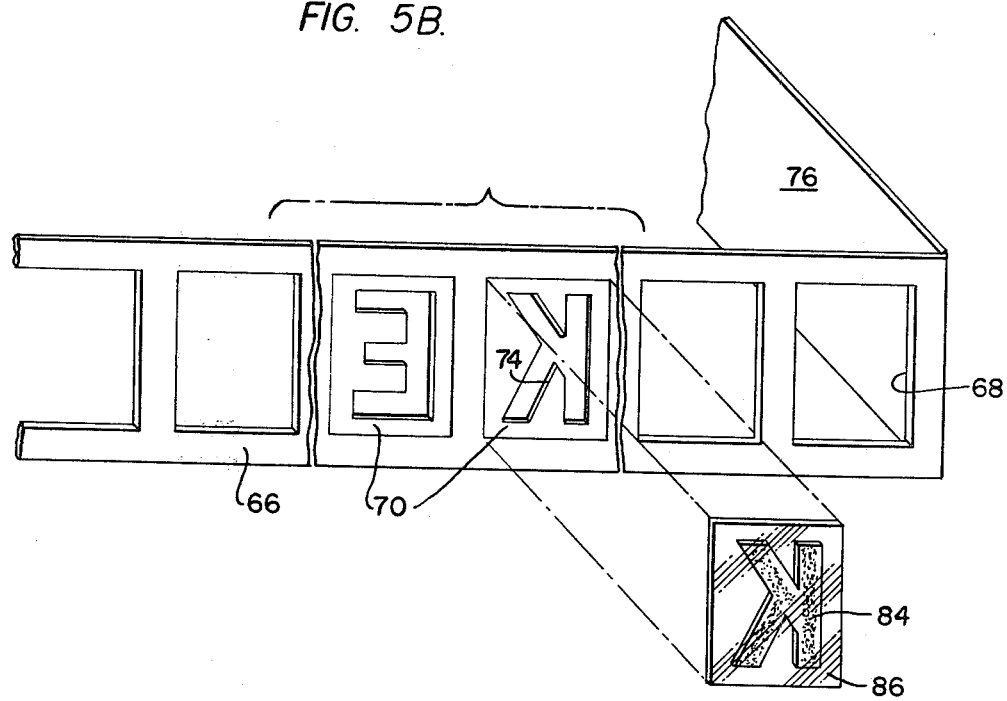
FIG. 5B is a rear view of the template of FIG. 5A illustrating the use of a plurality of guide characters receiving means.
Figure 5C:
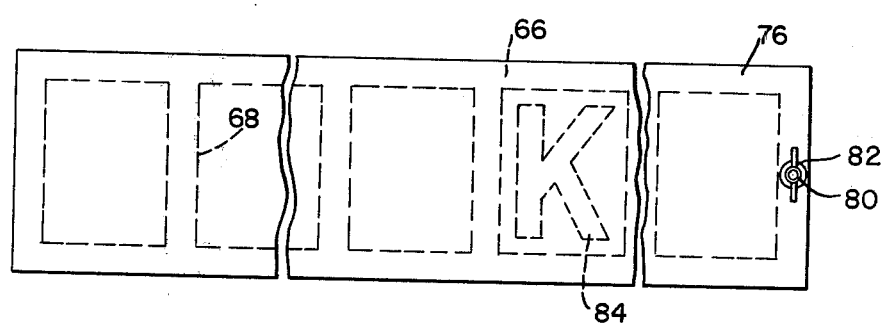
FIG. 5C is a view of the template of FIG. 5A with a hinged overlay closed over the guide; and, FIG. 5D is a view of the base member to which the elements of the display, illustrated in solid and phantom line, are located.

FIGS. 5A, 5B and 5C illustrate an alternative template apparatus particularly suited to the direct application of letters to the base member, without use of an intermediate replica of the letter. The template body 66 is a planar member, the outline of which preferably corresponds to the interior outline of the frame, as previously described, so as to be capable of aligning the display with respect to the base member, upon application to it within the frame. The template body has a plurality of alignment means or openings 68, each for receiving a guide 70. Preferably, each of the openings 68 has a bevelled edge 72, and the guides have complimentary bevelled edges (not shown) so that the guide is readily received in the opening only from one side of the template. A full set of letter guides would include at least 26 separate guides, the exterior dimensions of which would be identical but each of which has a cut-out portion 74 in the form of a separate letter of the alphabet. An overlay 76 secured to the template by hinges 78 is closed over the respective guides after the entire name desired to be applied has been set into the template; this results in an essentially rigid and completely aligned array of the letters precisely as they are to be applied to the base member. FIG. 5C shows the overlay 76 closed upon the template body by a wing nut 82 threaded onto a stud 80. FIG. 5B illustrates the disposition of a guide 70 in an alignment opening 68 so that the guide is immobilized against lateral movement by virtue of the cooperating bevelled edges of the template body and guide, when the overlay 76 is closed.

When the template apparatus has been set up in this manner so that guides are arranged in an order corresponding to the letters of the desired display, the letters to be applied are inserted in their respective guides. Each letter preferably carries an adhesive of the type commercially available for permanently bonding the letters to the surface of the base member. Preferably such an adhesive may be used which remains tacky and ready for use under a plastic or wax coated shield, which is then stripped off so that a permanent bond is formed between the letter and the surface of the base member virtually upon contact. Alternatively, any strong adhesive which will adequately and cleanly bond the two surfaces may be employed.

Figure 5D:
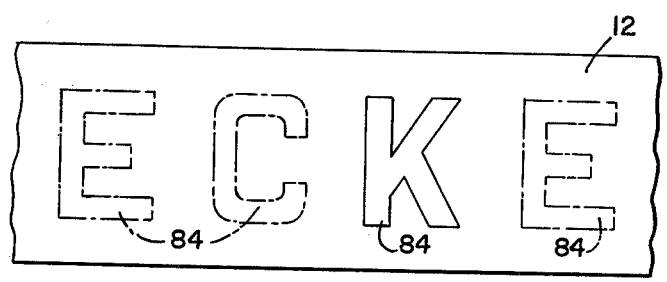

After closure of the template apparatus as illustrated in FIG. 5C, the backing sheets on the individual letters 84 may (if used) be removed, and the template applied firmly to the base member to adhere the letters thereto. Adequate final alignment between the template and the frame may be achieved simply by dimensioning the former to fit closely within the latter. FIG. 5D illustrates the resulting display, after the template is removed by simply pulling it away from the base member.

As described above with respect to FIGS. 2A and 2B, two forms of the template are preferably employed, one for an even and one for an odd number of letters to be applied. The maximum number of letters or characters that may be applied is determined by the size of the letters, the desired spacing between them (which is determined by the template dimensions) and the width of the frame. A standard size frame is preferably built into the vehicle when it is manufactured, of adequate size to accept even relatively long names. Shorter names can be accommodated simply by centering them in the template and omitting the use of the remaining alignment means to the left and right of the name. In exceptional instances requiring a display with a greater number of characters than there are alignment means, a special template may be provided along with corresponding guides for the application of smaller and/or more closely spaced letters. Alternatively, a frame of the desired size may be formed that is compatible with the surface of an already manufactured vehicle, and permanently applied to it as described above. In accordance with a preferred embodiment of the invention, the letters of the display are provided in font and finish identical to the letters forming the name of the car, further enhancing the appearance and impression conveyed by the display of being a fully integral part of the vehicle itself.

It will be apparent to those skilled in the art that various modifications and changes to the above disclosed specific embodiments may be made without departing from the scope and spirit of the invention, which is limited solely in accordance within the claims hereof.

What is claimed is:

1. In combination with a vehicle having a body surface, the combination comprising: frame means on the body surface providing a demarcation between the body surface and a surface area within said frame means, a base element defining said surface area within the frame means having a form and appearance, in presentation and disposition, continuous with that portion of the body surface immediately surrounding the frame means to convey the appearance that the base element is an integral part of the vehicle body surface, a display including a sequence of individual display characters arranged on said base element and centered with respect to said frame means, means securing each character to said base element, and means for releasably mounting said base element on said frame means in a position such that said base element and the body surface give the appearance of continuity.

2. The combination of claim 1 wherein said frame means is rectangular.

3. The combination of claim 1 wherein said body surface is comprised of the grill network of said vehicle and said frame means is an integral part thereof.

4. The combination of claim 1 wherein said securing means includes an adhesive carried by a back supporting surface of each said characters.

5. The combination of claim 1 wherein said securing means includes a plurality of projections extending from a back supporting surface of each said character, each projection adapted to be received through an opening in said base element, and fastener means for receipt on respective projections extending through said openings.

6. The combination of claim 1 wherein said securing means includes screw means adapted to be received through respective openings in said base element and threaded into bores in said characters arranged coaxially with said openings.

7. A template adapted for use in locating the position of a permanent display including at least one display member on the exposed surface of a base element within the bounds of a base element supporting frame, the template comprising in combination a template body substantially equal in size to the size of said exposed surface, alignment means in said template body formed by at least one opening therein, and guide means for receipt in a respective opening, each said guide means being of a size and outline for receipt in any one of said openings and supporting one of a replica of such display member of the permanent display and said display member.

8. The template of claim 7 wherein each said guide means supports a replica of a display member, and each said replica includes locating means arranged in a pattern whereby said pattern, corresponding to that display member, may be produced on such exposed surface for use in the permanent mounting of the display thereon.

9. The template of claim 8 further comprising at least a pair of mounting means adapted to be received by said frame for releasably mounting the template body in alignment with said exposed surface.

10. The template of claim 7 further comprising means for immobilizing each of said guide means in a respective alignment means, each said guide means supporting and aligning a permanent display member which is adapted to relocate from the guide means to the exposed surface for attachment thereto.

11. The template of claim 10 wherein said immobilizing means includes means within said alignment means for permitting receipt of said guide means in only one direction, and an overlay received on said template body to prevent movement of the guide means in said one direction.

* * * * *